United States Patent
Kita et al.

[11] Patent Number: 5,935,457
[45] Date of Patent: Aug. 10, 1999

[54] MACHINING FLUID PROCESSING APPARATUS FOR ELECTRIC DISCHARGE MACHINE

[75] Inventors: Yuki Kita; Hiroyuki Abe, both of Oshino-mura, Japan

[73] Assignee: Fanuc Ltd., Yamanashi, Japan

[21] Appl. No.: 08/793,889

[22] PCT Filed: Jul. 15, 1996

[86] PCT No.: PCT/JP96/01971

§ 371 Date: Mar. 12, 1997

§ 102(e) Date: Mar. 12, 1997

[87] PCT Pub. No.: WO97/03782

PCT Pub. Date: Feb. 6, 1997

[30] Foreign Application Priority Data

Jul. 14, 1995 [JP] Japan ................................. 7-200327

[51] Int. Cl.[6] .................................................. B23H 1/10
[52] U.S. Cl. ...................................... 219/69.14; 210/196
[58] Field of Search ........................ 219/69.14; 210/196, 210/403, 459, 195.1

[56] References Cited

U.S. PATENT DOCUMENTS

| | | | |
|---|---|---|---|
| 2,536,054 | 1/1951 | Harrington | 210/403 |
| 2,844,253 | 7/1958 | Everett | 210/403 |
| 3,678,240 | 7/1972 | Dietrick | 219/69.14 |
| 4,292,174 | 9/1981 | Smith et al. | 210/196 |
| 5,034,123 | 7/1991 | Tanaka et al. | 210/196 |
| 5,322,623 | 6/1994 | Benskin et al. | 210/196 |
| 5,417,851 | 5/1995 | Yee | 210/196 |
| 5,571,408 | 11/1996 | Rising | 210/195.1 |
| 5,798,492 | 8/1998 | Enya et al. | 219/69.14 |

FOREIGN PATENT DOCUMENTS

| | | | |
|---|---|---|---|
| 59-73234 | 4/1984 | Japan | 219/69.14 |
| 59-97816 | 6/1984 | Japan | 219/69.14 |
| 3-190627 | 8/1991 | Japan | 219/69.14 |
| 5-162017 | 6/1993 | Japan | 219/69.14 |

*Primary Examiner*—Geoffrey S. Evans
*Attorney, Agent, or Firm*—Staas & Halsey

[57] ABSTRACT

A machining fluid processing apparatus for an electric discharge machine capable of easily exchanging a filter for a new one. A filter is horizontally supported on a support table in a tray which is provided over a machining fluid tank. The contaminated machining fluid is supplied from the contaminated machining fluid tank to an attachment pipe in the filter by a pump. The contaminated machining fluid passes through the filter while machining dust is removed from the machining fluid. The clean machining fluid is then returned to the clean machining fluid tank. The exchanging of the filter is performed by removing a nut and a seal washer, detaching the used filter from the attachment pipe and attaching a new filter thereon. Since the filter is not submerged in the machining fluid and is drawn out horizontally along the support table, the filter exchange is made easy.

11 Claims, 2 Drawing Sheets

MACHINING FLUID PROCESSING APPARATUS FOR ELECTRIC DISCHARGE MACHINE

TECHNICAL FIELD

The present invention relates to a machining fluid processing apparatus for an electric discharge machine, such as a wire electric discharge machine and an engraving electric discharge machine.

BACKGROUND ART

In electric discharge machining by the wire electric discharge machine and the engraving electric discharge machine, a voltage is applied between an electrode and a workpiece in an insulative machining fluid to cause a discharge, so that the workpiece is machined by the thermal action (vaporization and melting) and the dynamical action (discharge impact pressure). The machining fluid passes an electric discharge machining region to become contaminated machining fluid containing machining dust caused by the electric discharge machining, and is collected in a contaminated fluid tank. The contaminated machining fluid taken from the contaminated fluid tank is filtered by a filter to remove the machining dust and then stored in a clean machining fluid tank. Then, the clean machining fluid is supplied from the clean machining fluid tank to the machining region again.

FIG. 3 is a schematic diagram showing a generally used conventional system for processing machining fluid by circulatoin. A filter 4 is disposed in a clean fluid tank 2 and is hence submerged in the clean machining fluid. The machining fluid having passed an electric discharge machining region is collected in a contaminated fluid tank 1 and then introduced from the contaminated fluid tank 1 to a filter attachment pipe 5, which is arranged at a center of the filter 4 and serves as a machining fluid passage, by a pump 3. The machining fluid is then introduced from the attachment pipe 5 into the clean fluid tank 2 through the filter 4 to thus remove machining dust from the machining fluid. The machining fluid is drawn up from the clean fluid tank 2 by the pump 2 and the clean machining fluid with the machining dust removed is supplied again to the machining region.

After a long-term use, the filter 4 is clogged with the machining dust to become unfit for use. Therefore, it is necessary to exchange the filter 4 for a new one. For exchanging the filter 4, it is necessary to remove a nut 6 threadedly fitted on a screw at an end of the filter attachment pipe 5 and a seal washer 7 and to pick up the filter 4 vertically along the filter attachment pipe 5, so that the filter 4 is removed from the filter attachment pipe 5. Since the filter 4 is clogged with the metal machining dust and submerged in the machining fluid, the filter 4 contains the machining fluid and therefore is very heavy (e.g., about 20 kg), thus requiring heavy labor in the exchanging operation of the filter.

Further, since both the contaminated fluid tank and the clean fluid tank are usually disposed under the electric discharge machine and other mechanical parts are disposed over the tanks, a spacial restriction makes it difficult to exchange the filter.

DISCLOSURE OF INVENTION

It is an object of this invention to provide a machining fluid processing apparatus for an electric discharge machine, in which a filter can be easily exchanged for a new one.

A machining fluid processing apparatus according to the present invention comprises: a filter for filtering contaminated machining fluid to obtain clean machining fluid; a tray having a support table for supporting the filter, for receiving the clean machining fluid filtered by the filter; and an attachment pipe extending horizontally over the tray to introduce the contaminated machining fluid to the filter, wherein the filter is detachably attached to the attachment pipe and supported by the support table. The filter may be formed into a cylindrical tube and the attachment pipe may be inserted into the cylindrical filter.

The contaminated machining fluid from the contaminated fluid tank passes through the filter, and the filtered machining fluid is received by the tray and introduced into the clean fluid tank. At that time, it is necessary to provide means for delivering the clean fluid to the clean fluid tank depending on the arrangement of the tray. The clean machining fluid can be introduced to the clean fluid tank with a simple structure by the effect of gravity by arranging the tray over the contaminated fluid tank and/or the clean fluid tank. As the used filter can be removed from the attachment pipe by moving it horizontally along the support table, the filter exchange is made easy.

BEST MODE FOR CARRYING OUT THE INVENTION

Figure 1:
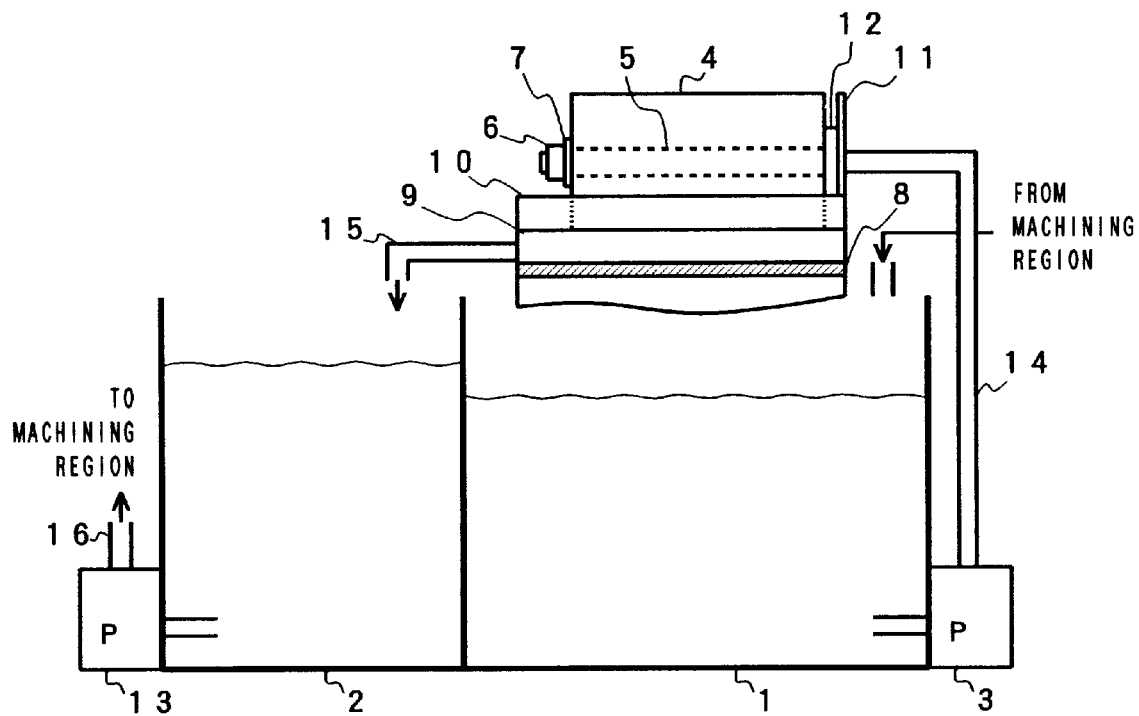
FIG. 1 is a schematic diagram showing a machining fluid processing apparatus according to an embodiment of the present invention.

As shown in FIG. 1, there is provided an attachment base 8, on which a tray 9 for receiving machining fluid filtered by a filter 4 is mounted, over a contaminated fluid tank 1. The tray attachment base 8 is formed into an inverted U shape extending over the contaminated fluid tank 1 or a clean fluid tank 2, or into a flat plate extending between opposite side plates of the contaminated fluid tank 1 or the clean fluid tank 2.

Figure 2:
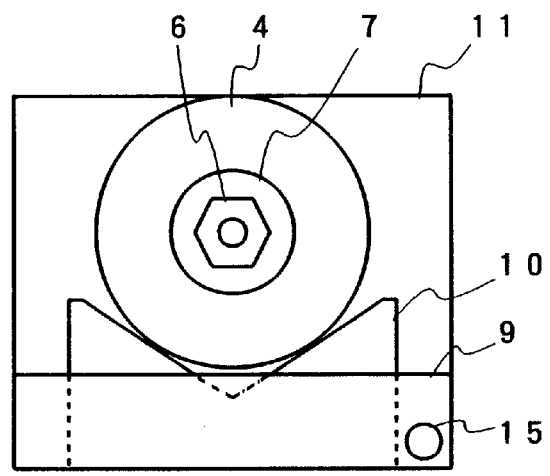
FIG. 2 is an enlarged side view of a filter and a tray of the machining fluid processing apparatus as shown in FIG. 1.
Figure 3:
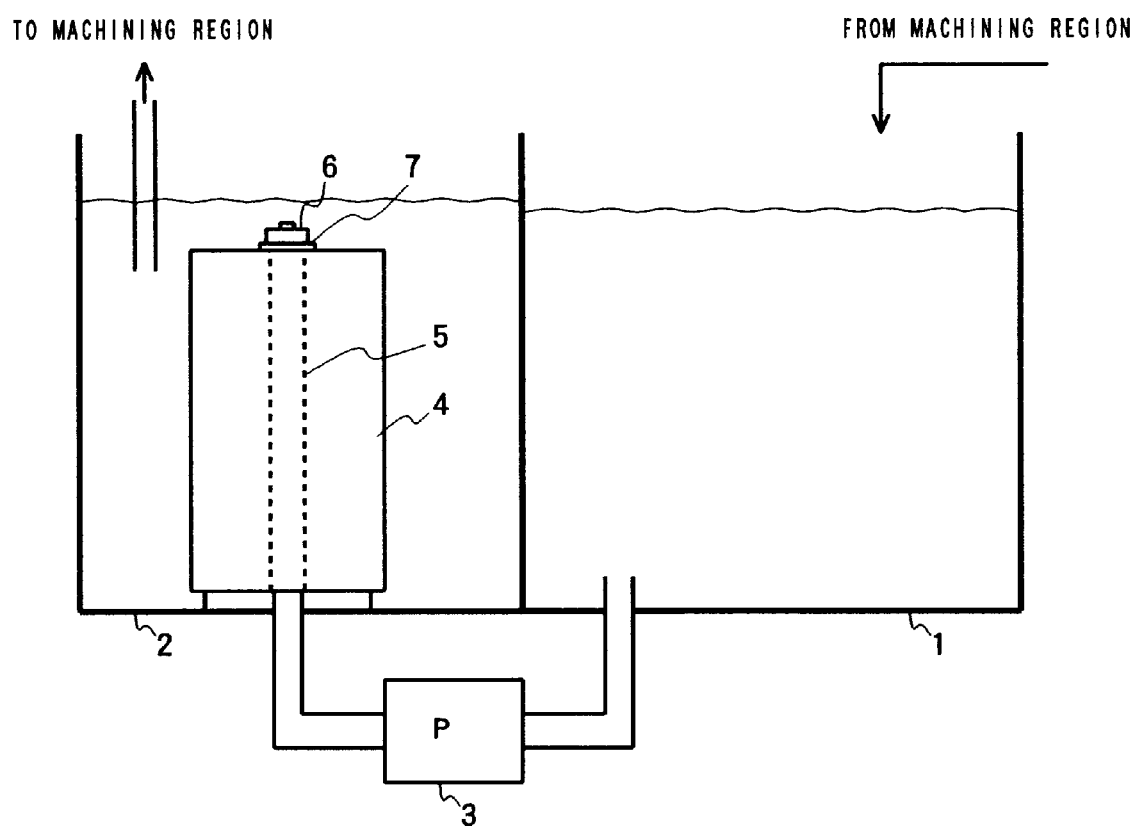
FIG. 3 is a schematic diagram showing a conventional machining fluid processing apparatus.

The tray 9 is provided with a support table 10 for supporting the filter 4. An attachment pipe 5 is attached to a side plate 11 of the tray 9, via a filter bracket 12 to which a pipe line 14 is attached. The attachment pipe 5 serves also as a passage for the contaminated machining fluid. FIG. 2 is an enlarged side view of the tray 9 and the filter 4 and others as viewed from the left side in FIG. 1. The V-shaped support table 10 for supporting the filter 4 is disposed in the tray 9 and the filter 4 is supported by the v-shaped support table 10.

The machining fluid passes the machining region and becomes contaminated machining fluid containing machining dust caused by electric discharge, and the contaminated machining fluid is collected in the contaminated fluid tank 1. The contaminated machining fluid in the contaminated fluid tank 1 is drawn up by a pump 3 and supplied to the attachment pipe 5 in the filter 4 through the pipe line 14. Then, the contaminated machining fluid flows out through holes formed in a circumference of the attachment pipe 5 and is filtered by the filter 4. As a result, the machining dust is removed from the contaminated machining fluid and the decontaminated and clean machining fluid is received by the tray 9. The clean machining fluid received by the tray 9 is introduced into the clean fluid tank 2 through a pipe line 15 and collected in the clean fluid tank 2. The clean machining fluid is drawn up from the clean fluid tank 2 by a pump 13 and supplied to the machining; region through a pipe line 16 for recycling.

When the filter 4 is used for a long period of time, it becomes clogged with metal machining dust and therefore has to be exchanged for a new one. For exchanging the filter 4, a nut 6 which is threadedly engaged with a screw provided at a distal end of the attachment pipe 5 and a seal washer 7 are removed, whereupon the used filter 4 is removed from the attachment pipe 5 by drawing the filter 4 to the left; side in FIG. 1 to slide it on the support table 10 along the attachment pipe 5. A new filter 4 is placed on the support table 10 with the attachment pipe 5 inserted through a central hole of the new filter 4, then the seal washer 7 is inserted on the attachment pipe 5, and the nut 6 is threadedly fitted on the male screw of the attachment pipe 5 to fasten the new filter 4 to the attachment pipe 5, to thus complete the filter change.

In the above exchanging of the filter 4, the filter 4 contains little machining fluid and is therefore light in weight when the exchanging operation is started after the machining fluid in the filter 4 thoroughly drains out with the electric discharge machine and the pump 3 is stopped. Further, as the filter 4 is supported on the support table 10 and is not submerged in the machining fluid in the tray 9, the filter 4 can be easily changed for a new one without any drop of the machining fluid from the filter 4.

In FIG. 1, the filter 4 is drawn to the left side, however, the filter 4 may be drawn in a direction towards a front side of the electric discharge machine, i.e. towards an operation front of the electric discharge machine, by rearranging the tray 4 and the support table 10 and other elements, so that the filter 4 can be easily attached to and detached from the operation front of the electric discharge machine.

Further, in the illustrated example of FIG. 1, the tray 9 is disposed over the contaminated fluid tank 1. Alternatively, the tray 9 may be disposed over the clean fluid tank 2 or over both the clean fluid tank 2 and the contaminated fluid tank 1.

The tray 9 is not necessarily disposed over the contaminated fluid tank 1 and/or the clean fluid tank 2 and may be disposed sideways of the tanks 1 and 2. In this case, an additional pump is necessary for supplying the decontaminated machining fluid from the tray 9 to the clean fluid tank 2.

According to the machining fluid processing apparatus of the present invention, since the filter is horizontally supported on the support table in the tray, the filter can be easily exchanged for a new one by simply drawing the filter along the support table. Particularly, unlike conventional machining fluid processing apparatus, the filter is not submerged in the clean fluid tank and is therefore light in weight and free of the machining fluid to make the exchanging of the filter easy in comparison with the conventional apparatus, when the changing operation is started after the machining fluid thoroughly drains out from the filter.

Furthermore, in general, since the contaminated fluid tank and the clean fluid tank are usually disposed under the electric discharge machine and other mechanical parts are disposed over the tanks, there is a restriction in drawing the filter upwardly. According to the present invention, however, since the filter is drawn out horizontally without any spatial restriction, the filter can be changed for a new one more easily.

We claim:

1. A machining fluid processing apparatus for an electric discharge machine, comprising:

a filter to filter contaminated machining fluid to obtain clean machining fluid;

a tray to receive the clean machining fluid filtered by said filter, said tray having a support table to directly support said filter; and an attachment pipe extending horizontally over said tray to introduce the contaminated machining fluid to said filter, wherein said filter is detachably attached to said attachment pipe, and detachable from said attachment pipe in the horizontal direction.

2. A machining fluid processing apparatus according to claim 1, wherein said filter is a cylindrical tube and said attachment pipe is inserted into said filter.

3. A machining fluid processing apparatus according to claim 2, wherein said support table has a V-shape cross-section, said filter has a circular cross-section, and said filter rests in the V-shape of said support table.

4. A machining fluid processing apparatus according to claim 1, further including a contaminated machining fluid tank to store the contaminated machining fluid to be filtered by said filter, and a clean machining fluid tank to store the clean machining fluid filtered by said filter, said tray being disposed over at least one of said contaminated machining fluid tank and said clean machining fluid tank.

5. A machining fluid processing apparatus according to claim 4, wherein said filter is a cylindrical tube and said attachment pipe is inserted into said filter.

6. A machining fluid processing apparatus according to claim 5, wherein said support table has a V-shape cross-section, said filter has a circular cross-section, and said filter rests in the V-shape of said support table.

7. A machining fluid processing apparatus for an electric discharge machine, comprising:

a filter to filter contaminated machining fluid to obtain clean machining fluid;

a tray to receive the clean machining fluid filtered by said filter, said tray having a support table disposed over at least one of a contaminated machining fluid tank and a clean machining fluid tank to support said filter; and an attachment pipe extending over said tray to introduce the contaminated machining fluid to said filter, wherein said filter is detachably attached to said attachment pipe and said support table supports said filter while said filter is detached from said attachment pipe.

8. A machining fluid processing apparatus according to claim 7, wherein said support table has a V-shape cross-section, said filter has a circular cross-section, and said filter rests in the V-shape of said support table.

9. A machining fluid processing apparatus for an electric discharge machine, comprising:

a filter to filter contaminated machining fluid to obtain clean machining fluid;

a support table disposed over at least one of a contaminated machining fluid tank and a clean machining fluid tank to support said filter; and an attachment pipe to introduce the contaminated machining fluid to said filter, wherein said filter is detachably attached to said attachment pipe and said support table supports said filter while said filter is detached from said attachment pipe.

10. A machining fluid processing apparatus according to claim 9, wherein said support table has a V-shape cross-section, said filter has a circular cross-section, and said filter rests in the V-shape of said support table.

11. A machining fluid processing apparatus, comprising:
   a filter;
   a tray to receive filtered fluid filtered by said filter, said tray having a support table to directly support said filter; and
   an attachment pipe extending horizontally over said tray to introduce contaminated fluid to said filter,
   wherein said filter is detachably attached to said attachment pipe, and detachable from said attachment pipe in the horizontal direction.

\* \* \* \* \*